(12) United States Patent
Shimizu et al.

(10) Patent No.: US 7,912,048 B2
(45) Date of Patent: Mar. 22, 2011

(54) APPARATUS AND METHOD FOR DETECTING NETWORK ADDRESS TRANSLATION DEVICE

(75) Inventors: Naoto Shimizu, Yokohama (JP); Kentaro Aoki, Sagamihara (JP); Yukinobu Moriya, Tokyo (JP); Hideo Yasuniwa, Machida (JP)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 11/688,385

(22) Filed: Mar. 20, 2007

(65) Prior Publication Data
US 2007/0258452 A1 Nov. 8, 2007

(30) Foreign Application Priority Data
Apr. 20, 2006 (JP) ................ 2006-117235

(51) Int. Cl.
*H04L 12/28* (2006.01)
(52) U.S. Cl. .............. 370/389; 710/316; 379/342
(58) Field of Classification Search .............. 370/389, 370/254, 338; 726/3, 14
See application file for complete search history.

(56) References Cited

U.S. PATENT DOCUMENTS

| 7,154,874 | B2 * | 12/2006 | Bhagwat et al. | 370/338 |
| 7,599,365 | B1 * | 10/2009 | Sabol et al. | 370/389 |
| 2005/0195753 | A1 * | 9/2005 | Chaskar et al. | 370/254 |
| 2007/0157306 | A1 * | 7/2007 | Elrod et al. | 726/14 |
| 2008/0109879 | A1 * | 5/2008 | Bhagwat et al. | 726/3 |

FOREIGN PATENT DOCUMENTS

| JP | 2003-87333 | 3/2003 |
| JP | 2006-50405 | 2/2006 |
| WO | WO2005/057233 | 6/2005 |

OTHER PUBLICATIONS

SMS Configuration Manager From Wikipedia, the free encyclopedia.*
Extreme Networks Announces Security That Delivers Rapid Response for 10 Gigabit Networks Apr. 25, 2005 11:35 AM EDT.*
The InteropNET Core Brian Chee Dec. 15, 2005.*
The Free Library > Business and Industry > Business > PR Newswire > Nov. 15, 2005.*
Extreme puts threat mitigation in the core by Eric B. Parizo, News Editor Apr. 26, 2005 | SearchNetworking.com.*
Extreme Networks Clear-Flow & Sentriant Security Test Apr. 28, 2005 Copyright © 2005 Iometrix Inc.*
Security to 10gig by Simon Duddy on Sunday, May 1, 2005.*

(Continued)

*Primary Examiner* — Dang T Ton
*Assistant Examiner* — Lionel Preval
(74) *Attorney, Agent, or Firm* — John Merecki; Shimokaji & Associates, P.C.

(57) ABSTRACT

The method is that of detecting a network address translation device which transfers network data to a first device. This method includes: obtaining an address of a second device connected to the network; generating pseudo network data in which an address is set as a destination address, and in which a number of times that the network data can be transferred is set as a number of transfers required to reach the first device; transmitting the pseudo network data to the second device; detecting a message from the second device, the message indicating that the pseudo network data cannot be further transferred; and determining that the second device is operating the network address translation device in response to the detection of the message.

6 Claims, 10 Drawing Sheets

OTHER PUBLICATIONS

Blackdiamond 10808 © 2005 Extreme Networks, Inc. All rights reserved.*

Avaya Solution & Interoperability Test Lab © 2006 Avaya Inc. All Rights Reserved.*

Teruaki Takahashi, A consideration of a NAT detection technique using IPid, IPSJ SIG Technical reports vol. 2006 No. 26, Japan, Information Processing Society of Japan, Mar. 17, 2006, vol. 2006, No. 26, p. 97-102.

Mamoru Mimura, A consideration of a NAT detection technique using TTL, Computer Security Symposium 2006 (CSS2006), Japan Information Processing Society of Japan, Oct. 25, 2006, vol. 2006, No. 11, p. 305-310.

* cited by examiner

701
```
Frame 916 (62 bytes on wire, 62 bytes captured)
Internet Protocol, Src Addr: 192.168.94.30 (192.168.94.30), Dst Addr: 192.168.94.56 (192.168.94.56)
    Identification: 0x01ed (493), Time to live: 128
Transmission Control Protocol
    Source port: 3019 (3019),   Destination port: 23 (23),   Flags: 0x0002 (SYN)
```

702
```
Frame 918 (60 bytes on wire, 60 bytes captured)
Internet Protocol, Src Addr: 192.168.94.30 (192.168.94.30), Dst    Addr: 192.168.94.56 (192.168.94.56)
    Identification: 0x01ee (494), Time to live: 128
Transmission Control Protocol
    Source port: 3019 (3019),   Destination port: 23 (23),   Flags: 0x0010 (ACK)
```

703
```
Frame 945 (62 bytes on wire, 62 bytes captured)
Internet Protocol, Src Addr: 192.168.94.30 (192.168.94.30), Dst Addr: 192.168.94.56 (192.168.94.56)
    Identification: 0xc132 (49466), Time to live: 127
Transmission Control Protocol
    Source port: 2118 (2118),   Destination port: 23 (23),   Flags: 0x0002 (SYN)
```

704
```
Frame 947 (60 bytes on wire, 60 bytes captured)
Internet Protocol, Src Addr: 192.168.94.30 (192.168.94.30), Dst Addr: 192.168.94.56 (192.168.94.56)
    Identification: 0xc133 (49467), Time to live: 127
Transmission Control Protocol
    Source port: 2118 (2118),   Destination port: 23 (23),   Flags: 0x0010 (ACK)
```

CONNECTION VIA NAT

Frame 916 (62 bytes on wire, 62 bytes captured)
Internet Protocol, Src Addr: 192.168.94.30 (192.168.94.30), Dst Addr: 192.168.94.56 (192.168.94.56)
    Identification: 0x01ed (493),   Time to live: 128
Transmission Control Protocol
    Source port: 3019 (3019),   Destination port: 23 (23),   Flags: 0x0002 (SYN)

802

Frame 918 (60 bytes on wire, 60 bytes captured)
Internet Protocol, Src Addr: 192.168.94.30 (192.168.94.30), Dst    Addr: 192.168.94.56 (192.168.94.56)
    Identification: 0x01ee (494),   Time to live: 128
Transmission Control Protocol
    Source port: 3019 (3019),   Destination port: 23 (23),   Flags: 0x0010 (ACK)

803

Frame 945 (62 bytes on wire, 62 bytes captured)
Internet Protocol, Src Addr: 192.168.94.30 (192.168.94.30), Dst Addr: 192.168.94.56 (192.168.94.56)
    Identification: 0xc13a (49466),   Time to live: 127
Transmission Control Protocol
    Source port: 2118 (2118),   Destination port: 23 (23),   Flags: 0x0002 (SYN)

804

Frame 947 (60 bytes on wire, 60 bytes captured)
Internet Protocol, Src Addr: 192.168.94.30 (192.168.94.30), Dst Addr: 192.168.94.56 (192.168.94.56)
    Identification: 0xc13b (49467),   Time to live: 127
Transmission Control Protocol
    Source port: 2118 (2118),   Destination port: 23 (23),   Flags: 0x0010 (ACK)

CONNECTION VIA NAT

FIG. 8

901
```
Frame 916 (62 bytes on wire, 62 bytes captured)
Internet Protocol, Src Addr: 192.168.94.30 (192.168.94.30), Dst Addr: 192.168.94.56 (192.168.94.56)
    Identification: 0x01ed (493),  Time to live: 128
Transmission Control Protocol
    Source port: 3019 (3019),   Destination port: 23 (23),   Flags: 0x0002 (SYN)
```

902
```
Frame 918 (60 bytes on wire, 60 bytes captured)
Internet Protocol, Src Addr: 192.168.94.30 (192.168.94.30), Dst    Addr: 192.168.94.56 (192.168.94.56)
    Identification: 0x01ee (494),  Time to live: 128
Transmission Control Protocol
    Source port: 3019 (3019),   Destination port: 23 (23),   Flags: 0x0010 (ACK)
```

903
```
Frame 945 (62 bytes on wire, 62 bytes captured)
Internet Protocol, Src Addr: 192.168.94.30 (192.168.94.30), Dst Addr: 192.168.94.56 (192.168.94.56)
    Identification: 0xc13a (49466),  Time to live: 127
Transmission Control Protocol
    Source port: 2118 (2118),   Destination port: 23 (23),   Flags: 0x0002 (SYN)
```

904
```
Frame 947 (60 bytes on wire, 60 bytes captured)
Internet Protocol, Src Addr: 192.168.94.30 (192.168.94.30), Dst Addr: 192.168.94.56 (192.168.94.56)
    Identification: 0xc13b (49467),  Time to live: 127
Transmission Control Protocol
    Source port: 2118 (2118),   Destination port: 23 (23),   Flags: 0x0010 (ACK)
```

CONNECTION VIA NAT

FIG. 9

APPARATUS AND METHOD FOR DETECTING NETWORK ADDRESS TRANSLATION DEVICE

BACKGROUND OF THE INVENTION

The present invention relates to a technology for grasping a state, where a terminal not having obtained connection authorization is connected to a terminal, such as a PC, having obtained proper authentication, by causing a network address translation device to operate thereon.

Commonly, a computer not having obtained authorization is prevented from being connected to a network (e.g., intranet) of a corporation and the like in order to prevent information leakage and proliferation of computer viruses. For this purpose, at authentication switches, and at wireless access points, after terminals are authenticated in accordance with IEEE 802.1x or the like, the authenticated terminals are discriminated by use of MAC addresses (media access control addresses) thereof, or by use of the MAC addresses and IP addresses (Internet protocol addresses) thereof in combination. The same discrimination is performed in each product and system, which makes it possible to detect unauthorized connected terminals. As described above, a technique for discriminating terminals by use of MAC addresses and IP addresses thereof is commonly used.

On the other hand, there is a technique for connecting an unauthorized terminal to a network in the following manner. Specifically, a plurality of LAN (local area network) cards are installed in an authorized terminal having obtained connection authorization, and then the NAT (network address translation) and NAPT (network address port translation) on the authorized terminal are caused to be active. As a result, the unauthorized terminal is connected to the network via the NAT or NAPT of the authorized terminal. An employee of a corporation may use such a connection without malice in order to connect a PC (personal computer) or the like, which is used by the employee at home, to a network of the corporation. In this case, the PC may be connected without antivirus software installed therein. In the worst case, the PC may be connected in a state of being infected by a computer virus. Such a terminal not having obtained connection authorization should not be permitted to connect to the network.

However, it is difficult to detect this PC because the PC is connected to the network via the NAT/NAPT of the authorized terminal, and thereby a MAC address and an IP address of packets sent from the PC not having obtained connection authorization are replaced by those of the authorized terminal. For this reason, even when there is a dubious access or operation to or in the intranet, it is difficult for a network administrator to find the source of such an access or operation.

In "Detecting NAT Devices using sFlow (URL: http://www.sflow.org/detectNAT/)" (Non-patent Document 1), information passed through a switch is collected in an analysis server by use of the sFlow protocol (RFC 3176) in order to find out the above-mentioned terminals each operating a NAT/NAPT. The analysis server checks TTL (time-to-live) values of IP headers, and thus identifies the terminals each operating the NAT/NAPT. In "NATDet—NAT Detection Tool (URL: http://elceef.itsec.pl/natdet/)" (Non-patent Document 2), although details of the technology are not explained, it appears that a terminal operating a NAT is identified by using the TTL values, timestamp values of TCP (transmission control protocol) headers or the like of network data passed through a network.

In each of Non-patent Documents 1 and 2, a rate of NAT/NAPT detection is not very high because the detection is performed merely by monitoring packets. Moreover, these technologies cannot be considered highly reliable in detecting a NAT/NAPT for at least the following reason. Although initial values of the TTL values are determined to be 128 for a Microsoft Windows OS (operating system) (Windows is a registered trademark of Microsoft Corporation in the United States and/or other countries), and to be 64 for a Linux OS (Linux is a registered trademark of Linux Torvalds in the United States and/or other countries), a user can easily manipulate each of these values by changing a registry or a configuration file of the OS.

It is necessary to detect, with high accuracy, a terminal operating a network address translation device, such as a NAT or NAPT, and to cause the terminal not to function as the network address translation device.

SUMMARY OF THE INVENTION

The present invention provides a method of detecting a network address translation device. The method is that of detecting the network address translation device which transfers network data to a first device (for example, a device connected to a network via a NAT/NAPT). The method includes: obtaining an address of a second device (for example, a single PC or a plurality of PCs connected to the network) connected to the network; generating pseudo network data in which an address is set as a destination address, and in which a number of times that the network data can be transferred is set as a number of transfers required for reaching the first device; transmitting the pseudo network data to the second device; detecting, from the second device, a message that the pseudo network data cannot be further transferred; and determining, in response to the detection of the message, that the second device is operating the network address translation device. The method makes it possible to detect, with high accuracy, a terminal operating a NAT or NAPT.

The aforementioned method further includes, in a case where it is determined that the second device is operating the network address translation device, invalidating the network address translation device by changing the number of times that the network data transmitted to the device having been connected to the network can be transferred. This method makes it easier to manage the network because invalidation processing on the NAT/NAPT is configured to be automatically performed after the NAT/NPAT is detected.

BRIEF DESCRIPTION OF THE DRAWINGS

For a more complete understanding of the present invention and the advantage thereof, reference is now made to the following description taken in conjunction with the accompanying drawings.

FIG. 7 exemplifies changes in ID fields in IP headers.

FIG. 8 is an exemplification of TTL values of packets.

FIG. 9 is an exemplification of port numbers of packets.

DETAILED DESCRIPTION OF THE INVENTION

Figure 1:
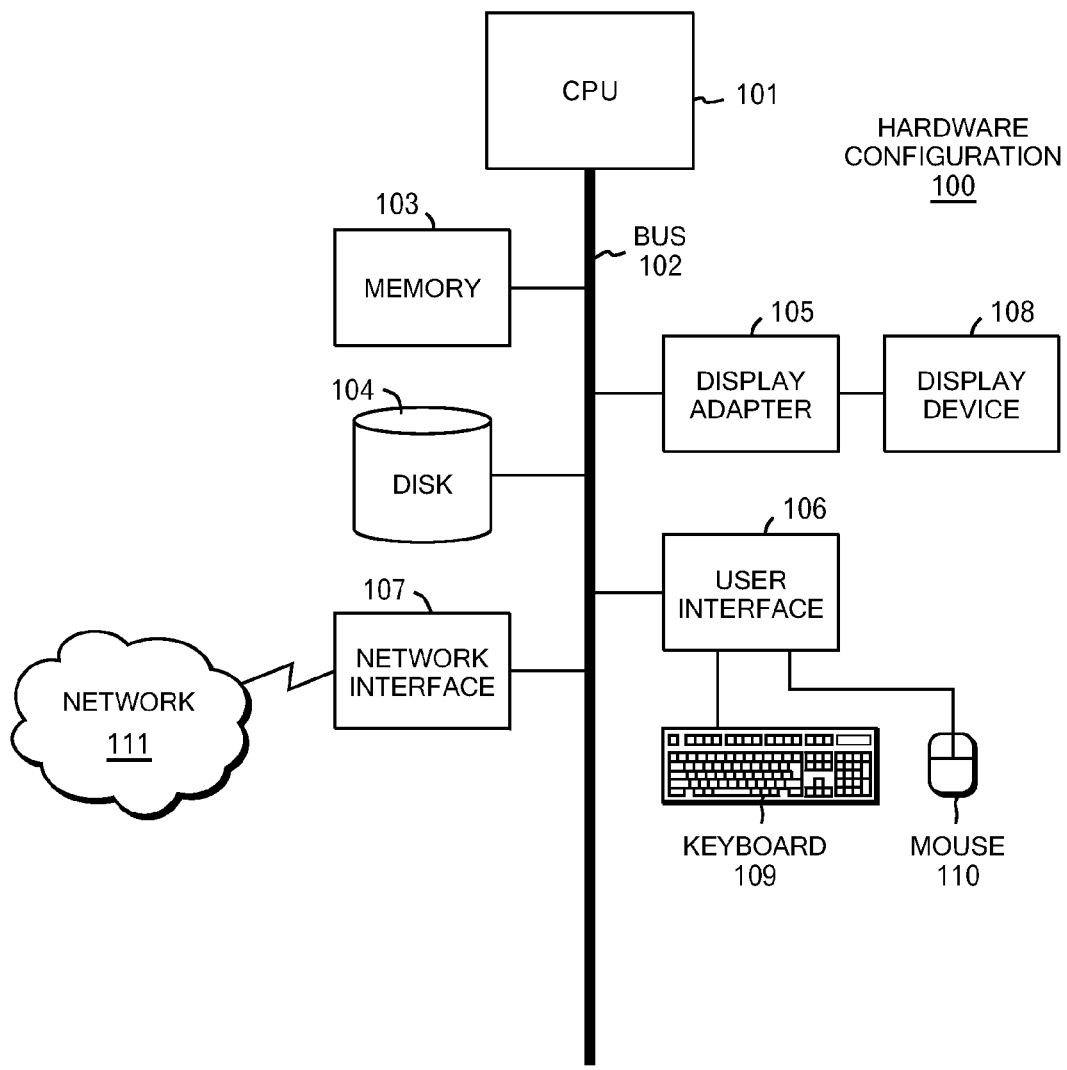
FIG. 1 shows an outline of an illustrative hardware configuration of an apparatus for detecting a terminal operating a network address translation device.

FIG. 1 shows an outline of an illustrative hardware configuration 100 of an apparatus for detecting a terminal operating a network address translation device (a NAT which translates IP addresses, or a NAPT which translates IP addresses and port numbers). A CPU 101, which is a central processing unit, executes various programs under the control of operating systems of various kinds. The CPU 101 is mutually connected to a memory 103, a disk 104, a display adapter 105, a user interface 106 and a network interface 107 via a bus 102.

The disk 104 includes software and operating systems which are required to cause a computer to function and programs used for executing the operation systems and the present invention. Each of these programs is read into a memory 103, and is executed by the CPU 101 when needed. Data, such as network data (packets), captured by monitoring a network, and network addresses already checked, are stored in the disk 104 Note that other types of memory can be substituted for the disk 104. It will be obvious to those skilled in the art that any recordable medium will suffice for the disk 104, and that the disk 104 is not limited to a hard disk.

The apparatus of the present invention is connected to a keyboard 109 and a mouse 110 via the user interface 106; to a display apparatus 108 via the display adapter 105; and to a network 111 via the network interface 107. The apparatus is operated by means of the keyboard 109 and the mouse 110, and intermediate statuses and results of processing are displayed on the display apparatus 108. A network card or the like is connected to the network interface 107. The network data are obtained and transmitted via the network interface 107.

In some cases, the present invention may be implemented in a distributed environment via the network 111. Note that this hardware configuration is only an exemplification of one embodiment of a computer system, a bus arrangement and a network connection, and that characteristics of the present invention can be substantiated in any one of various system configurations, in a form provided with a plurality of identical configuration elements, or in a form further distributed over the network.

Figure 2:
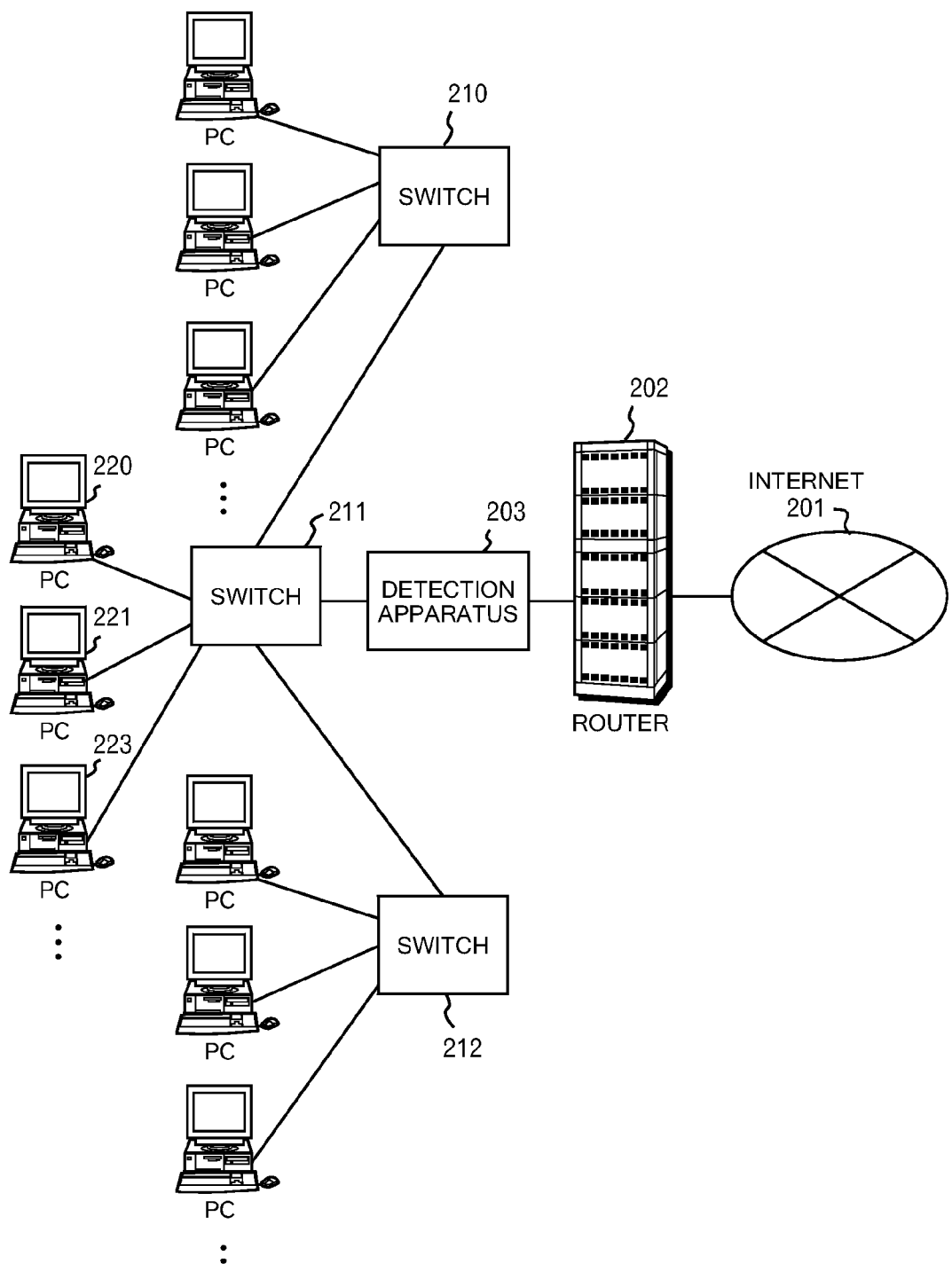
FIG. 2 is an example of a network environment where the network address translation device detection apparatus operates.

FIG. 2 is an example of a network environment where the network address translation device detection apparatus operates. For example, a terminal is connected, via the Internet 201, to a router 202 in a corporation, and further to the network address translation device detection apparatus 203 of the present invention. The network address translation device detection apparatus 203 is connected to a network switch 211, and network switches 210 and 212 are both connected to the network switch 211. The router 202 forms a sub-network. A plurality of PC terminals are connected to each of the network switches 210, 212, and PCs 220, 221, ..., are connected to the network switch 211. As can be seen in FIG. 2, the network address translation device detection apparatus 203 of the present invention is located between the router 202 and the network switch 211.

The network address translation device detection apparatus 203 can obtain all of the network data transmitted from the PCs connected to the other network switches 210 and 212 as well as from the PCs 220, 221, ..., connected to the network switch 211. If an L3 switch exists in a position where the router 202 exists, and the L3 switch is provided with a mirroring function, it suffices that the network address translation device detection apparatus 203 be directly connected to the mirroring function. Hence, the L3 switch needs not be located in the abovementioned position. In another embodiment, a network data capturing apparatus may be provided between each of the PCs and a corresponding one of the network switches in the network address translation device detection apparatus 203. A configuration of the network connection is not limited to that of FIG. 2.

Figure 3:
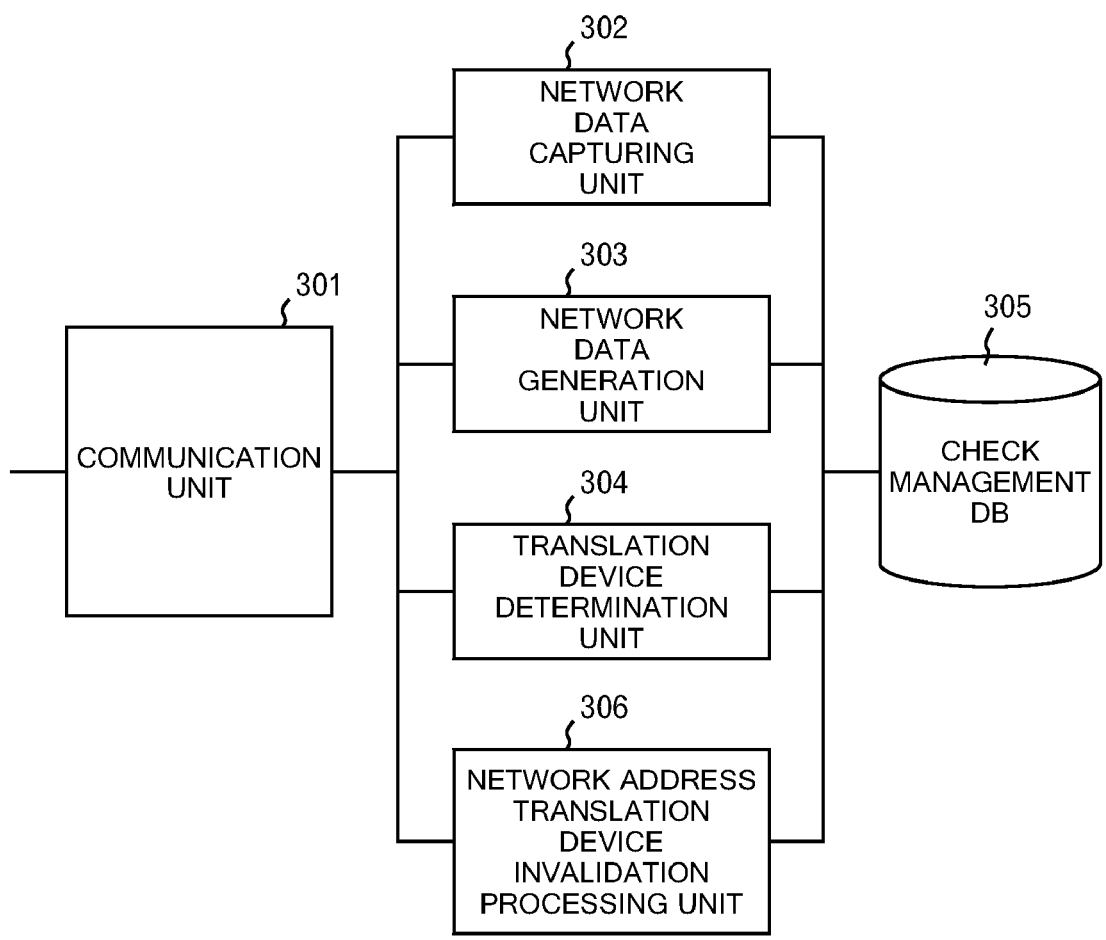
FIG. 3 shows an outline of a functional configuration of the network address translation device detection apparatus.

FIG. 3 shows an outline of a functional configuration of the network address translation device detection apparatus. A communication unit 301 is used for collecting and transmitting network data. A network data capturing unit 302 captures network data transmitted by each of the PCs. A network data generation unit 303 generates pseudo network data having the same set values as those of a destination address, a source address, a source port and a destination port which are captured by the network data capturing unit 302. A parameter is set for the generated network data, so that the generated network data cannot be further transferred, that is, so that an error message that the generated network data cannot be further transferred can be issued when the transfer is attempted. Thereafter, the generated network data is transmitted from the communication unit 301.

A network address translation device determination unit 304 determines whether or not the error message that transfer cannot be performed is returned after the network data is transmitted. In a case where the error message that transfer cannot be performed is retuned, it means that the network address translation device is operating. Accordingly, it can be determined that a PC terminal having the network address of the network data is operating the NAT/NAPT. A check management DB 305 stores captured network data and network addresses already checked. A network address translation device invalidation processing unit 306 performs processing of substantially invalidating the NAT/NAPT by partially changing parameters of network data addressed to a device operating the NAT/NAPT. Details of the invalidation will be described later.

Figure 4:
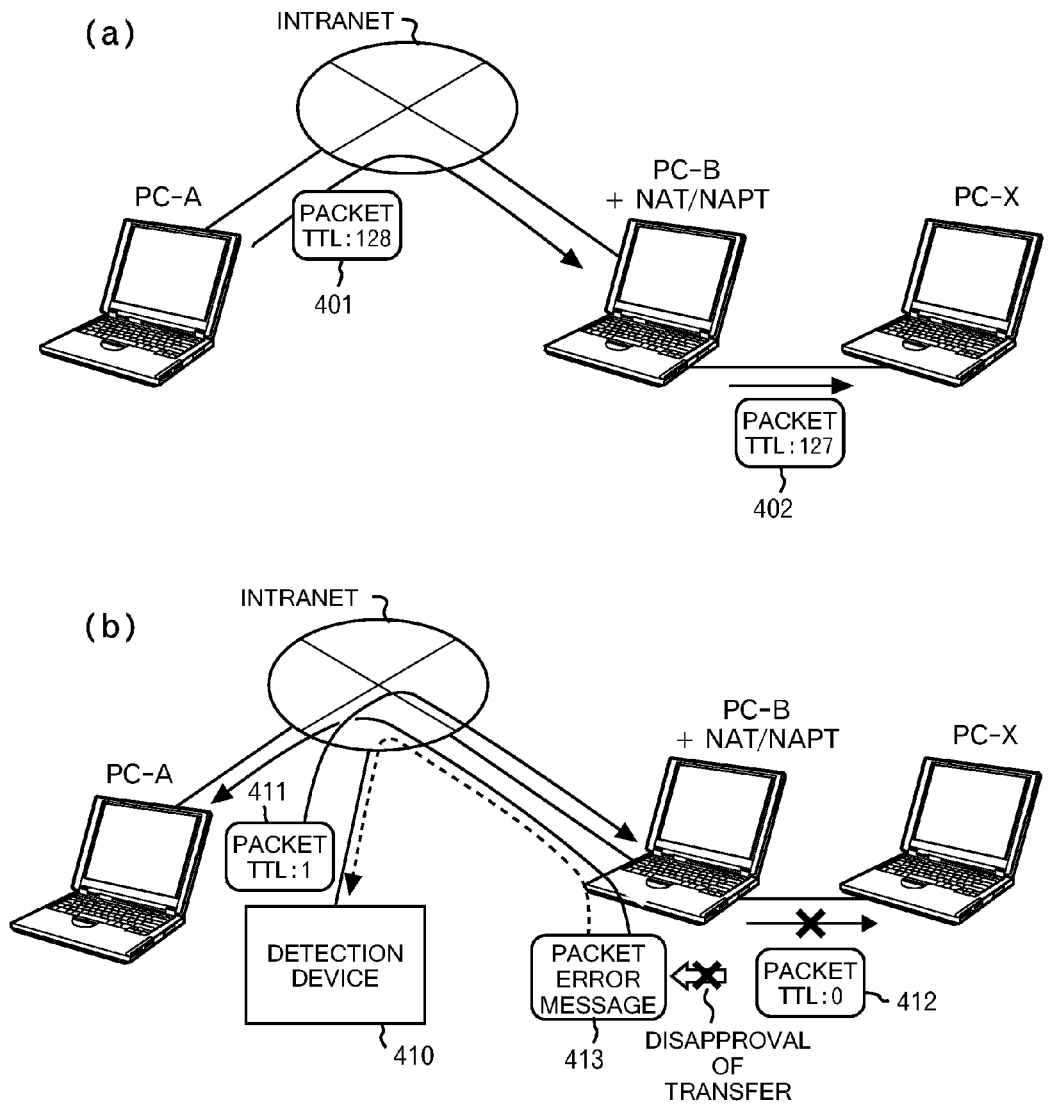
FIGS. 4A and 4B each schematically show the time when network data, such as a packet, is transferred to a PC operating the network address translation device.

FIGS. 4A and 4B each schematically show the time when network data, such as packets, are transferred to a PC operating a NAT/NAPT which is a network address translation device. FIG. 4A shows a manner in which a packet, which is network data transmitted from a conventional Windows OS, is transferred by the NAT/NAPT. A packet 401 is transmitted from a PC-A. After the packet 401 reaches a PC-B, a network address thereof is changed, and thus the packet 401 is transferred as a packet 402 to a PC-X. In the packet 401, an initial TTL value, which is a parameter indicating a number of times that the packet 401 can be transferred, is set at 128. When the packet 401 is transferred by the NAT/NAPT device, the TTL value is decreased by 1, and thus the TTL value is 127 in the packet 402. Incidentally, in the case of Linux, the initial TTL value is 64.

FIG. 4B schematically shows a manner in which a packet 411 is generated by a network address translation device detection apparatus 410. The network address translation device detection apparatus 410 transmits, to the PC-B, a packet of which TTL value is 1. Alternatively, a packet 411 may be generated on the basis of a packet captured between the PC-A and the PC-B. In the PC-B on which the NAT/NAPT operates, in a case where this packet is transferred as a packet 412 to the PC-X, the TTL value, which is a number of times that the packet can be transferred, is 0. Hence, an error message is transmitted to the PC-A that the packet cannot be transferred. When an error message 413 is detected by the network address translation device detection apparatus 410, it is apparent that the PC-B is operating the NAT/NAPT.

Figure 5:
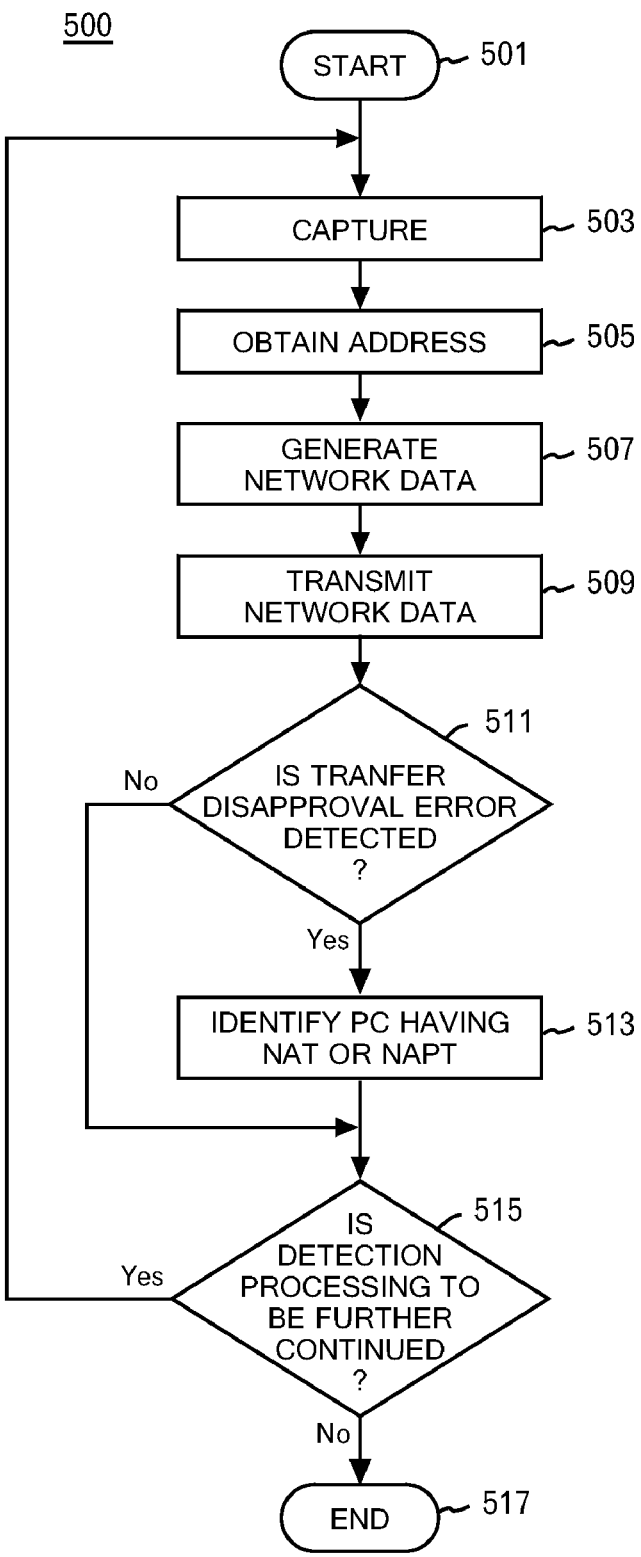
FIG. 5 exemplifies an illustrative processing flow for detecting the network address translation device.

FIG. 5 exemplifies a processing flow for detecting a network address translation device. The processing starts in 501. In 503, network data, which is transmitted from a PC connected to a network, is captured. In 505, a destination address of the network data captured in 503 is obtained. Here, the processing may be configured to not check again an address of a PC already checked. In a case where the destination address is an address of a PC already checked, the processing returns to 503 so that different network data can be obtained. The processing can be configured not to check the address again by registering already-checked addresses in the check management DB 305, and by managing the already-checked addresses thus registered in the check management DB 305.

Alternatively, the processing in 503 and 505 may be configured to obtain an address from a router, or an ARP (address resolution protocol) table. In 507, network data, which has the destination address obtained in 505, is generated. This network data is provided with parameter settings such as setting a TTL value, which is a number of times that the packet can be transferred, to be 1. Details thereof will be described later. In 509, the network data generated in 507 is transmitted. In 511, it is determined whether or not an error message that the network data transmitted in 509 cannot be transferred is detected.

In a case where the error message is not detected in 511 (No), the processing proceeds to 515. On the other hand, in a case where the error message is detected in 511 (Yes), a PC, which is a destination address of the network data, is identified, in 513, to be operating a NAT/NAPT. In 515, it is determined whether or not the detection processing is to be further continued. In a case where it is determined in 515 that the processing is to be continued (Yes), the processing returns to 503 to perform the detection processing on another PC address. In a case where it is determined in 515 that the processing is not to be continued (No), the processing proceeds to 517, and is thus terminated.

Figure 6:
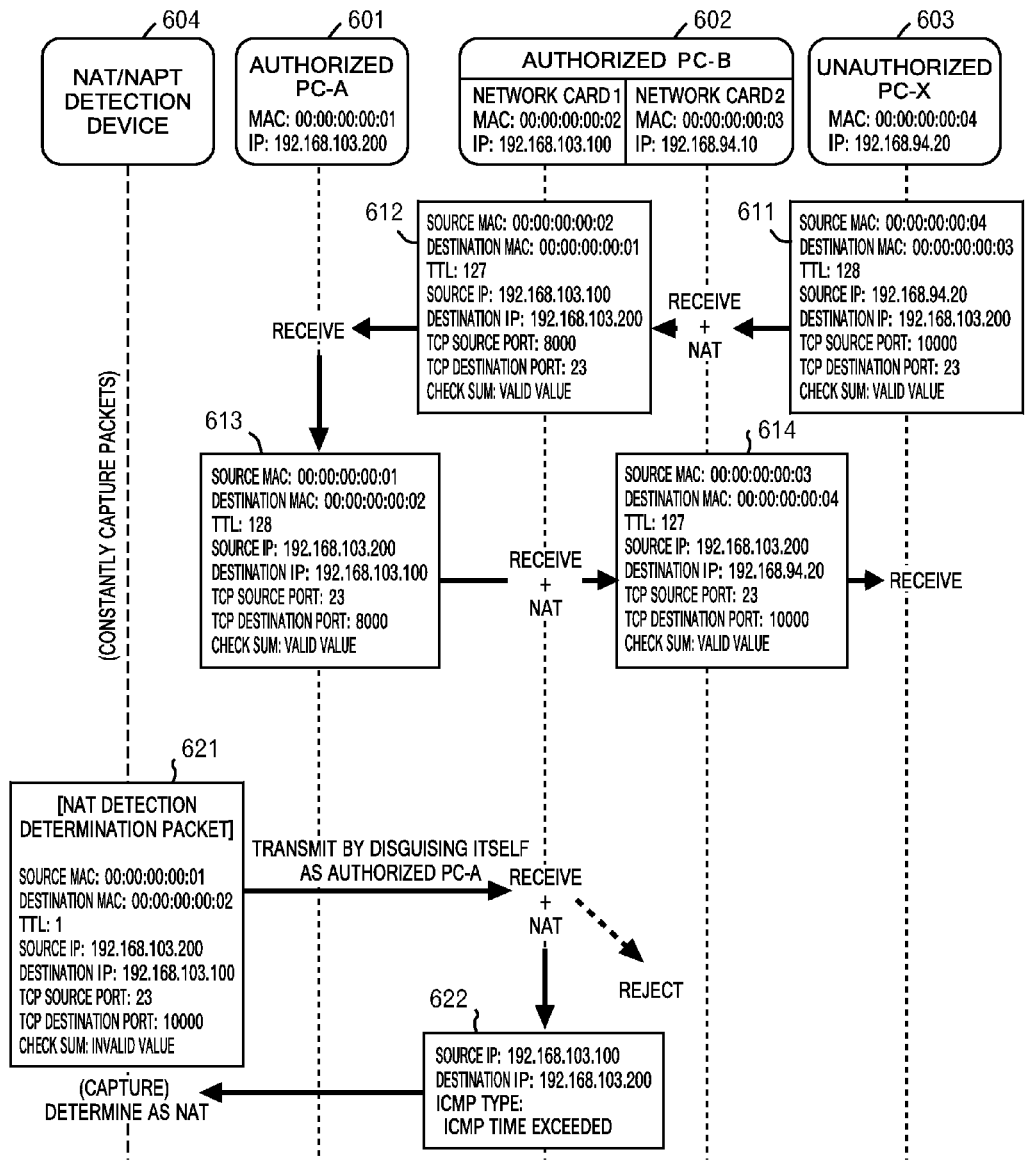
FIG. 6 is a diagram showing an outline of processing performed on a packet by a NAT/NAPT detection device.

FIG. 6 shows an outline of processing of a packet which is network data, in accordance with the flow in FIG. 5 performed by a NAT/NAPT detection apparatus. A PC-A 601 is configured to have a MAC address "00:00:00:00:00:01" and an IP address "192.168.103.200". A PC-B 602 is supposed to be a terminal operating a NAT/NAPT. That is, the authorized network side of the PC-B 602 has a network card 1 which has been configured to have a MAC address "00:00:00:00:00:02" and an IP address "192.168.103.100".

Another network card 2 has a MAC address "00:00:00:00:00:03" and an IP address "192.168.94.10", and is connected to the private network side. Furthermore, a PC-X to which connection authorization is not granted is connected to the PC-B via the NAT/NAPT. The PC-X is configured to have a MAC address "00:00:00:00:00:04" and an IP address "192.168.94.20." IN this event, it is supposed that a NAT/NAPT detection system 604 is in operation.

The PC-X is supposed to be performing transmission and reception of packets with the PC-A via the NAT/NAPT of the PC-B. A packet 611 transmitted from the PC-X is configured to have a source MAC address "00:00:00:00:00:04," a destination MAC address "00:00:00:00:00:03 (the MAC address of the network card 2)," an TTL value "128," a source IP address "192.168.94.20," a destination IP address "192.168.103.200 (the IP address of the PC-A)," a TCP source port number "10000," a TCP destination port number "23," and a TCP flag "ACK+PSH". The addresses of the packet 611 are changed by the NAT/NAPT of the PC-B. When the packet 611 is transmitted from the network card 1 to the PC-A, the MAC addresses, the IP addresses, the port numbers and the like are changed into those of a packet 612.

A packet 613 is sent from the PC-A as a response. The packet 613 is transmitted as a packet 614 from the network card 2 via the NAT/NAPT of the PC-B. The NAT/NAPT detection apparatus 604 captures the packet 613, generates a packet 621 for detecting the NAT/NAPT, and transmits the packet 621 to the PC-B. Here, in the packet 621, the TTL value in an IP header is set at 1, and an invalid value is input as a checksum value of a TCP thereof.

The reason is as follows. In a case where the PC-B is not operating the NAT/NAPT, the TCP checksum is incorrect. Thus, there is no influence over the operation after receiving the packet by the PC-B, except that the packet is rejected by the PC-B. A TCP flag of the packet 621 may be set as "ACK." This is also because an irrelevant "ACK," when received, results in rejection of the packet with the irrelevant "ACK" by the PC-B. In a case of a UDP session, an incorrect value may be put in a UDP checksum.

In a case where the PC-B is operating the NAT/NAPT, an ICMP (Internet Control Message Protocol) Time Exceeded massage 622 is sent so as to indicate that the packet 622 cannot be further transferred to other terminals. In a case where the packet 622 is detected, the NAT/NAPT detection apparatus 604 determines that the PC-B is operating the NAT/NAPT. Incidentally, even if the packet 621 is originally to be processed by the PC-B, other processing is not affected except that the packet 621 is rejected since the checksum value is incorrect.

However, the NAT/NAPT detection apparatus 604 sometimes fails to capture the packet 622. In order to increase an accuracy of the detection, the transmission of the packet 621 from the NAT/NAPT detection system can be repeated more than once.

In order to further increase the accuracy, it can also be considered that the NAT/NAPT is detected concurrently with other items being checked. For example, FIG. 7 shows changes in ID fields in IP headers. Values in the ID fields of packets 701 and 702 differ significantly from corresponding values in the ID fields of packets 703 and 704. Thereby, it is expected that packets, though sent from the same PC, has two structures in the ID. IN such a case, it is expected that the above PC is operating a NAT/NAPT.

Additionally, whether a PC is operating a NAT/NAPT can be determined by checking values in TTL fields in IP headers. For example, as shown in FIG. 8, packets 801 and 802 have TTL values of 128, which can be determined to be an initial TTL values sent from a Windows OS. On the other hand, packets 803 and 804 have TTL values of 127, and can be determined to be those transferred by the NAT/NAPT. However, since a user can freely set a TTL value by changing a registry of a PC, checking TTL values alone may lack reliability. For this reason, in such a case, the TTL values can be used in combination with the detection of the packet 622 shown in FIG. 6.

Moreover, whether or not a PC is operating NAT/NAPT can be determined by checking values of port numbers in TCP headers or in UDP headers. As shown in FIG. 9, port numbers in packets 901 and 902 are so different (discontinuous) from those in packets 903 and 904 that, in a case where those packets are from the same source, it is considered that the source is possibly operating the NAT/NAPT.

Furthermore, whether or not a PC is operating NAT/NAPT can be determined by checking values of TCP timestamps. A machine time differs from one PC to another. For this reason, in a case where a plurality of packets mutually having considerably different timestamps are transmitted from the same PC within a certain time period, that is, where discontinuous values of timestamps are observed, it is considered that the PC is possibly operating the NAT/NAPT.

Figure 10:
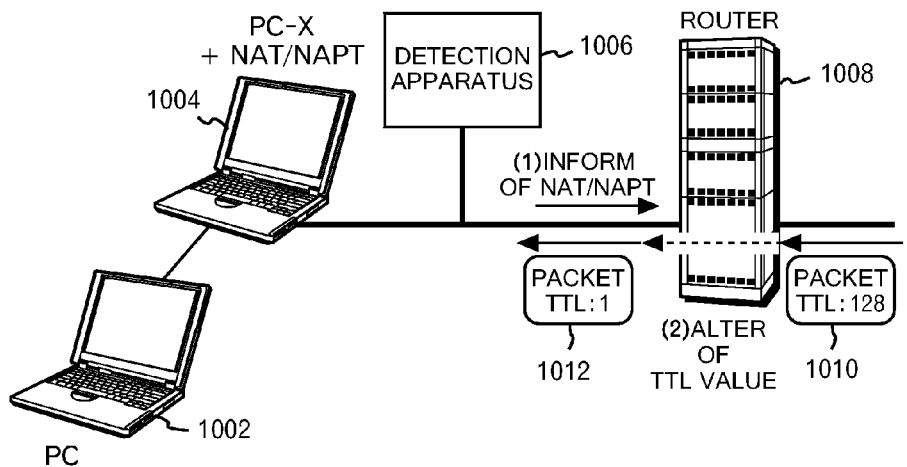
FIG. 10 exemplifies a method of invalidating a NAT/NAPT.

FIG. 10 shows a method of invalidating a NAT/NAPT of a PC operating the NAT/NAPT. Here, in order to invalidate the NAT/NAPT, a TTL value of a packet addressed to the PC operating the NAT/NAPT is changed to 1. This can be made possible in the following manner. Specifically, a function of changing the TTL value to 1 is added to a router or a Layer 3 switch. Thereby, after being informed of an address of the PC operating the NAT or NAPT, the TTL value is set at 1 when the router or the Layer 3 switch relays a packet addressed to that PC. That is, when a packet 1010 is routed, a TTL value thereof is changed to 1 as in the case with that of a packet 1012.

Figure 11:
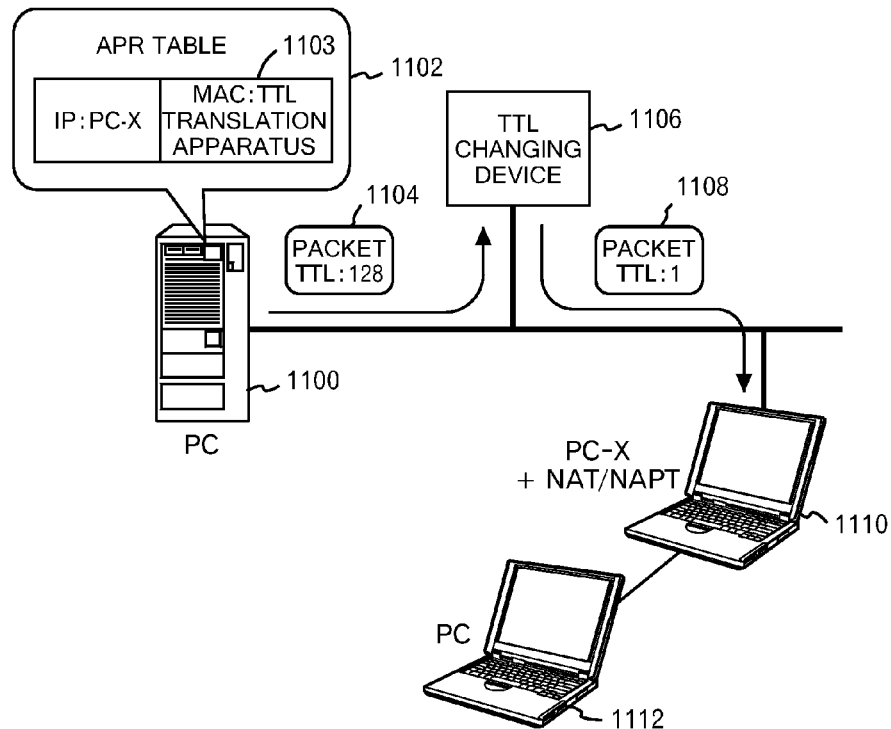
FIG. 11 exemplifies another method of invalidating a NAT/NAPT.

In FIG. 11, a TTL value of the packet can also be changed to 1 by changing an APR table of a PC 1100 and thereby changing a packet, which has been addressed to that PC, into one addressed to a TTL changing device. This can be achieved by changing a MAC address 1103, which corresponds to a PC operating the NAT/NAPT in an ARP table 1120, into a MAC address of a TTL translation apparatus. Thereby, packets addressed to the PC-X are caused to always pass through a TTL changing device 1106. For example, a packet 1104 having a TTL value of 128 is changed into a packet 1108 having a TTL value of 1. As a result, the NAT/NAPT can be substantially invalidated.

According to the present invention described above, a PC operating a network address translation device such as a NAT or a NAPT can be detected with high accuracy. In addition, after such a PC is found, the NAT or the NAPT can be invalidated with ease.

The foregoing description of the embodiments of this invention has been presented for purposes of illustration and description. It is not intended to be exhaustive or to limit the invention to the precise form disclosed, and many modifications and variations are possible.

What is claimed is:

1. A method of detecting a network address translation device which transfers original network data to a first device, comprising:
    obtaining an address of a second device connected to a network;
    generating pseudo network data in which the address is set as a destination address, and in which a number of times that the pseudo network data is able to be transferred is set as a number of transfers required to reach the first device;
    transmitting the pseudo network data to the second device;
    detecting a message from the second device, the message indicating that the pseudo network data cannot be further transferred;
    determining that the second device is operating the network address translation device, in response to a detection of the message, and further in response to a presence of a discontinuity between two successive transmission control protocol (TCP) timestamps of two successive output network data packets transmitted from the second device within a specified time period; and
    changing the original network data including setting the number of times that the original network data is able to be transferred from an initial time to live value of an operating system to 1 when it has been determined that the second device generates an incorrect checksum based on the network address translation device changing values associated with the pseudo network data.

2. The method according to claim 1, further comprising:
    changing a media access control address in an address resolution protocol (ARP) table associated with the first device when it has been determined that the second device is operating as the network address translation device; and
    invalidating functioning of the network address translation device; and
    changing the initial time-to-live value of a packet addressed to the first device to 1 by changing the address resolution protocol table into one addressed to a time-to-live changing device.

3. The method according to claim 1, further comprising:
    capturing the original network data passed through the network; and
    obtaining the destination address of the captured original network data; and transmitting a network address translation device detection packet from the first device to the second device; and
    increasing the number of times the network address translation device detection packet is transmitted from the first device to the second device.

4. The method according to claim 1, wherein the original network data is a packet, and the number of times that the original network data is able to be transferred is a time-to-live value; and
    including:
    adding a function changing the time-to-live value to a router; and
    routing all packets addressed to the second device through the router or another time-to-live changing device.

5. The method according to claim 1, wherein the network address translation device is a network address port translation device.

6. The method according to claim 1, further comprising:
    determining that the second device is operating the network address translation device according to at least one or more time-to-live (TTL) values of packets, a presence or an absence of a discontinuity between two successive port numbers of the packets, and a presence or an absence of a discontinuity between two successive transmission control protocol (TCP) timestamps of the packets.

* * * * *